UNITED STATES PATENT OFFICE.

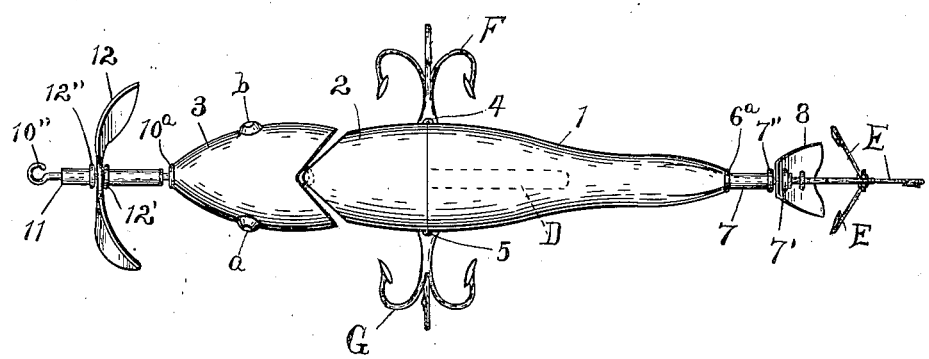
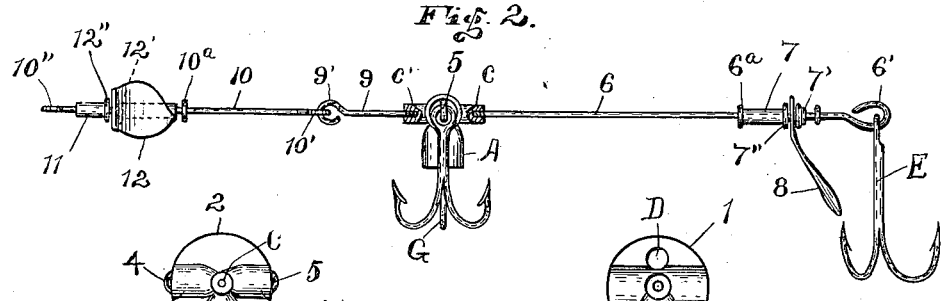
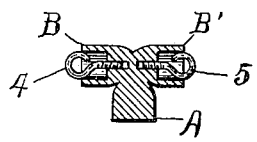
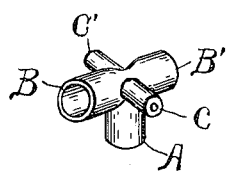
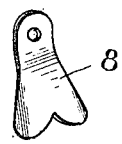

CHARLES M. WILCOX, OF NEW PARIS, OHIO, ASSIGNOR OF ONE-THIRD TO JAMES E. KIRKPATRICK, OF ANDERSON, INDIANA, AND ONE-THIRD TO CHARLES P. KIRKPATRICK, OF NEW PARIS, OHIO.

FISH-DECOY.

No. 870,069.   Specification of Letters Patent.   Patented Nov. 5, 1907.

Application filed April 1, 1907. Serial No. 365,850.

*To all whom it may concern:*

Be it known that I, CHARLES M. WILCOX, a citizen of the United States, residing at New Paris, in the county of Preble and State of Ohio, have invented certain new and useful Improvements in Fish-Decoys, of which the following is a full and complete specification and exposition, being such as will enable others to make and use the same with absolute exactitude.

The object of my present invention, broadly speaking, is to provide a fish decoy of simple and inexpensive construction, practical and efficient in operation, strong and durable in construction, and which can be manufactured and sold at a comparatively low price.

More specifically stated my object is to provide a fish lure or bait adapted to be trolled in water and being so constructed that it will describe a zig-zag course,—that is to say the device will be caused to wiggle as it travels forward. This wiggling motion of the device is perhaps the most important feature of the present invention, and it is caused primarily by a rear single-blade spinner, and also to some extent by reason of the head of the device being pivoted to the body, the head being free to move a limited distance from side to side.

Other objects, briefly stated, are: to provide a metal skeletonization or framework connecting all of the parts; providing means for securing the hooks to the metal frame and not depending on their being secured to wooden parts as the moisture acting on the wood allows the hooks to soon become loosened from the body; the means by which the hooks of the body portion may be adjusted whereby they may be caused to stand out at an angle, or to hang pendent, as desired; to provide the lure, which should simulate a minnow-fish, with a pivotal head which will allow the body to move from side to side when it is being trolled, thereby more nearly resembling a live bait; and, finally, to provide means for weighting the under side of the lure and also to provide an air-chamber on the inside of the upper portion thereof to cause the device to float right side up.

Other objects and particular advantages will be brought out in the course of the ensuing specifications and the objects may be determined by an inspection of the drawings forming a part of this specification.

One manner of carrying out the objects of my invention, and that which in practice I have found the most practical, is illustrated in the accompanying drawings, in which—

Figure 1 is a top or plan view of the invention complete and in operative position. Fig. 2 is a side elevation of the metal portions or framework of the invention. Fig. 3 is a view of the rear end of the middle section. Fig. 4 is a view of the front end of the rear section. Fig. 5 is a central cross-section of the central metal hanger and weight; and Fig. 6 is a perspective view of the same. Fig. 7 is a perspective view of the rear or single-blade spinner. And Fig. 8 is a longitudinal central sectional view of the body portion of the invention.

Similar reference characters denote like parts throughout the several views of the drawings.

In order that my invention may be the more readily understood and its several advantages fully appreciated, I will now take up a detail description thereof and I will refer to the various parts and the operations thereof as briefly and as compactly as I may.

The numeral 1 designates the rear part of the body portion of the device. The numeral 2 denotes the central portion of the body. And the numeral 3 denotes the head. The forward end of the member 2 is formed tapering or wedge-shaped, and in the rear end of the head 3 is formed vertically a notch whose angle is greater than is the angle of said wedge of the member 2. The point of the wedge portion of the member 2 is adapted to rest in the vortex of the notch of the head, and by reason of the differences in the angles of the wedge and the notch the head 3 is adapted to rock horizontally. The rear points of the head 3, on each side of said notch, resemble gills, while the letters $a$ and $b$ designate a similitude for eyes. The parts 1, 2 and 3 are formed, preferably, of wood or other buoyant material in order to cause the device to float.

The hanger member shown most clearly in Figs. 5 and 6 comprises a weight A having on its upper end the oppositely disposed socket-hangers B and B' which are joined together in the center and they are also joined with said weight. Extending out at right angles from the juncture of the socket-hangers and being oppositely disposed with reference to each other are the lugs C and C' each having a threaded aperture extending centrally thereinto as shown. Also in the base of the cavities of the socket-hangers B and B' are threaded apertures to receive the respective screw-eyes 4 and 5, as shown in Fig. 5. The hanger member above described is adapted to be inclosed between the adjoining ends of the members 1 and 2, fitting half in each member, the ends of said members being carved out for that purpose as shown in Figs. 3 and 4.

Formed in the member 1 and extending from its forward end back into the body some distance is an air-chamber or floater D, which after being formed I propose to line with a water proofing, such as paraffin, and then close the opening thereinto with a cork or the like, designated by the index $d$.

The numeral 6 denotes a rod which is disposed through the member 1 longitudinally and centrally thereof with its forward end adapted to be screwed into the lug C, and its rear end projecting back beyond the member 1 and terminating in a hook 6'. Secured around the rod 6 at the rear end of the member 1 is a collar 6ª. Revolubly mounted around the rod 6 and adjoining the collar 6ᵃ is a sleeve 7 to which is rigidly secured the single blade 8, foming the rear spinner. A second collar, 7', is secured around the rod 6 immediately in the rear of the sleeve 7, thereby retaining the said spinner revolubly in position. A group of hooks E may be suspended from the hook 6' as shown in Figs. 1 and 2.

The numeral 9 designates a rod disposed centrally through the member 2, with its rear end threaded into the lug C', and having an eye 9' formed on its forward end, there being a cavity formed in the forward end of the member 2 whereby said eye may enter almost flush with the wedge part of the member 2, as shown in Fig. 8. It should be noticed that when the rods 6 and 9 are thus positioned, as in Fig. 8, it will retain the members 1 and 2 together and inclosing and retaining in position the hanger member.

The numeral 10 denotes a rod which passes longitudinally through the head 3 and having an eye 10' formed on its rear terminal which eye is interlocked with the eye 9', as shown in Fig. 2. Secured around said rod 10, immediately in front of the head 3, is a collar 10ᵃ which retains the head at the proper point as in Fig. 1. The forward terminal of the rod 10 is the eye 10'', which is to have secured thereto a troll-line (not shown).

Revolubly mounted around the rod 10 and extending between the collar 10ᵃ and the eye 10'' is the sleeve 11. Mounted on the sleeve 11 is the double-blade spinner 12 which is secured in place by the two collars 12' and 12'', in same manner as the blade 8 is secured in place on the sleeve 7 by the collars 7' and 7''.

A group of hooks F is secured pendent in the eye of the screw-eye 4, and a group of hooks G is secured pendent in the eye of the screw-eye 5, all substantially as indicated.

It will now be notably apparent that if a line be secured in the eye 10'' and if the device be drawn thereby through the water that the front spinner will revolve, tending to retain the device in a direct course, as the blades will counterbalance each other, and at the same time the rear spinner will revolve, and as the blade 8 will be first on one side and then on the other it will cause the rear end of the lure to shift first to one side and then to the other, by which as the lure advances it will be caused to wiggle, that is it will describe a zig-zag course, and as the head is pivoted to the body portion it will follow a direct forward course controlled by the front spinner.

It is apparent that the screw-eyes 4 and 5 may be run in or out of the cavities, formed therefor in the sides of the device, in order to vary the inclination of their respective groups of hooks F and G, when out said hooks will hang pendent, and when in then the hooks will be caused to project out at an angle, the inclination of said groups of hooks depending on the adjustment of said screw-eyes.

Having now fully shown and described my invention and the best means for its construction and operation to be known at this time, what I claim and desire to secure by Letters Patent of the United States, is—

1. In a fish decoy adapted to be trolled, a body containing an air-chamber, means for closing the air-chamber, a head pivoted to the forward end of the body, a single-blade spinner revolubly mounted in the rear of the body and adapted to impart a zig-zag motion to the body when the device is being trolled.

2. In a fish lure comprising a body, a head pivoted to the body, a frame included in the body and the head, and a spinner adapted to impart a wiggling motion to the device when it is being trolled.

3. In a fish lure comprising a buoyant body, a head pivoted in front of the body for lateral movements with relation thereto, a frame on which the head and the body are secured, and a single-blade spinner mounted on said frame and located in the rear of the body.

4. In a fish decoy including a buoyant body, a head pivoted in front of the body and pivotedly mounted with relation to the body, a frame on which the head and the body are secured, a double-blade spinner mounted on said frame in front of the head, and a single-blade spinner mounted on said frame and located in the rear of the body.

5. In a fish bait simulating a minnow, a buoyant body, a head pivotally connected to the body, and a spinner adapted to cause the device to wiggle when being trolled, all substantially as shown and described.

6. In a lure or bait simulating a minnow or the like, a two-part body, a head pivoted to the body, a frame on which the body and head are mounted, and a spinner for causing the device to describe a zig-zag course when being trolled.

7. A fish lure simulating a live bait, comprising a body, a head pivoted to the body, hooks pendent from the body with means for changing the inclinations of said hooks, a forward two-blade spinner, and a rear single-blade spinner adapted to revolve and cause the device to describe a zig-zag course through the water when being trolled.

8. A fish lure comprising a metal frame, a buoyant body mounted on the frame, a head mounted on the frame and adapted to move laterally a limited distance, a plurality of hooks pivoted to the frame, means for adjusting the inclination of certain of the hooks, a rear single-blade spinner pivoted to the frame and adapted to cause the device to wiggle from side to side when it is being trolled forward.

9. A fish decoy constructed to simulate a live bait, comprising a metal frame, a plurality of hooks depending from said frame, a buoyant body mounted on the frame, a laterally movable head mounted on the frame and located in front of the body, a spinner mounted on the frame in front of the head and adapted to cause the head to follow a direct forward course when being trolled, a second spinner mounted on the frame in the rear of the body and adapted to cause the rear portion of the body to wiggle from side to side when being trolled.

10. A fish bait comprising a body having an air chamber therein, a frame on which the body is mounted, a head pivoted to the forward end of the body by said frame which projects through the head and the body, a forward double-blade spinner, a rear single-blade spinner, socket hangers located in the sides of the body and carried by said frame, screw-eyes threaded in said socket hangers, and groups of hooks depending from said screw-eyes, the inclination of said hooks depending on the distance said screw-eyes are inserted in said socket hangers.

In testimony whereof I have hereunto subscribed my name in the presence of two witnesses.

CHARLES M. WILCOX.

Witnesses:
R. W. RANDLE,
R. E. RANDLE.